United States Patent
Lu et al.

(10) Patent No.: US 9,620,815 B2
(45) Date of Patent: Apr. 11, 2017

(54) ELECTROLYTE ADDITIVES FOR TRANSITION METAL CYANOMETALLATE ELECTRODE STABILIZATION

(71) Applicant: Sharp Laboratories of America, Inc., Camas, WA (US)

(72) Inventors: Yuhao Lu, Vancouver, WA (US); Long Wang, Vancouver, WA (US); Sean Vail, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 297 days.

(21) Appl. No.: 14/320,352

(22) Filed: Jun. 30, 2014

(65) Prior Publication Data

US 2015/0263383 A1   Sep. 17, 2015

Related U.S. Application Data (63) Continuation-in-part of application No. 14/271,498, filed on May 7, 2014, now Pat. No. 9,419,278, which
(Continued)

(51) Int. Cl.
*H01M 10/00* (2006.01)
*H01M 10/0567* (2010.01)
(Continued)

(52) U.S. Cl.
CPC ....... *H01M 10/0567* (2013.01); *H01M 4/136* (2013.01); *H01M 4/381* (2013.01);
(Continued)

(58) Field of Classification Search
CPC .. H01M 10/0567; H01M 10/054; H01M 4/58; H01M 4/381; H01M 10/44; H01M 4/136; Y02E 60/122
See application file for complete search history.

(56) References Cited

U.S. PATENT DOCUMENTS

| | | | | |
|---|---|---|---|---|
| 5,882,812 A | * | 3/1999 | Visco | ........... H01M 4/13 429/50 |
| 2012/0328936 A1 | * | 12/2012 | Wessells | ....... H01M 10/054 429/188 |

OTHER PUBLICATIONS

V.D. Neff, Some performance characteristics of a Prussian Blue battery, Journal of Electrochemical Society, 132 (1985) 1382-1384.
(Continued)

*Primary Examiner* — Emily Le
*Assistant Examiner* — Monique Wills
(74) *Attorney, Agent, or Firm* — Law Office of Gerald Maliszewski; Gerald Maliszewski (57) ABSTRACT

A method is provided for the self-repair of a transition metal cyanometallate (TMCM) battery electrode. The battery is made from a TMCM cathode, an anode, and an electrolyte including solution formed from a solvent and an alkali or alkaline earth salt. The electrolyte includes an additive represented as G-R-g: where G and g are independently include materials with nitrogen (N) sulfur (S), oxygen (O), or combinations of the above-recited elements; and where R is an alkene or alkane group. In response to charging and discharging the battery in a plurality of cycles, the method creates vacancies in a surface of the TMCM cathode. Then, the method fills the vacancies in the surface of the TMCM cathode with the electrolyte additive. An electrolyte and TMCM battery using the above-mentioned additives are also provided.

8 Claims, 5 Drawing Sheets

Related U.S. Application Data is a continuation-in-part of application No. 14/230,882, filed on Mar. 31, 2014, which is a continuation-in-part of application No. 14/198,755, filed on Mar. 6, 2014, which is a continuation-in-part of application No. 14/198,702, filed on Mar. 6, 2014, which is a continuation-in-part of application No. 14/198,663, filed on Mar. 6, 2014, which is a continuation-in-part of application No. 14/193,782, filed on Feb. 28, 2014, which is a continuation-in-part of application No. 14/193,501, filed on Feb. 28, 2014, now Pat. No. 9,406,919, which is a continuation-in-part of application No. 14/174,171, filed on Feb. 6, 2014, now Pat. No. 9,455,431, which is a continuation-in-part of application No. 14/067,038, filed on Oct. 30, 2013, now Pat. No. 9,450,224, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.
| | | |
|---|---|---|
| *H01M 10/054* | (2010.01) | |
| *H01M 4/58* | (2010.01) | |
| *H01M 4/38* | (2006.01) | |
| *H01M 10/44* | (2006.01) | |
| *H01M 4/136* | (2010.01) | |
| *H01M 10/0525* | (2010.01) | |
| *H01M 10/0569* | (2010.01) | |

(52) U.S. Cl.
CPC ........... *H01M 4/58* (2013.01); *H01M 10/054* (2013.01); *H01M 10/0525* (2013.01); *H01M 10/0569* (2013.01); *H01M 10/44* (2013.01); H01M 2300/0037 (2013.01); Y10T 29/49108 (2015.01)

(56) References Cited

OTHER PUBLICATIONS

N. Imanishi et al., Lithium intercalation behavior into iron cyanide complex as positive electrode of lithium secondary battery. Journal of Power Sources, 79 (1999) 215-219.
Y. Lu, L. Wang, J. Cheng, J.B. Goodenough, Prussian blue: a new framework for sodium batteries, Chemistry Communication, 48 (2012) 6544-6546.
L. Wang, Y. Lu, J. Liu, M. Xu, J. Cheng, D. zhang, J.B. Goodenough, A superior low-cost cathode for a Na-ion battery, Agnew. Chem. Int. Ed., 52(2013) 1964-1967.
A. Eftekhari, Potassium secondary cell based on Prussian blue cathode, J.Power Sources, 126 (2004) 221-228.
C.D. Wessells, R.A. Huggins, Y. Cui, Copper hexacyanoferrate battery electrodes with long cycle life and high power, Nature Communication, 2( 2011) 550.
C.D. Wessells et al., Nickel hexacyanoferrate nanoparticle electrodes for aqueous sodium and potassium ion batteries. Nano Letter, 11(2011) 5421-5425.
C.D. Wessells et al., The effect of insertion species on nanostructured open framework hexacyanoferrate battery electrode, J. Electrochem. Soc., 159(2012) A98-A103.
T. Matsuda, M. Takachi, Y. Moritomo, A sodium manganese ferrocyanide thin film for Na-ion batteries, Chemical Communications, DOI: 10.1039/C3CC38839E.
S.-H. Yu et al., Iron hexacyanoferrate nanoparticles as cathode materials for lithium and sodium rechargable batteries, ECS Electrochemistry Letters, 2(2013)A39-A41.
H.J. Buser, D. Schwartzenbach, W. Petter, A. Ludi, the crystal structure of Prussian blue: Fe4[Fe(CN)6]3·xH=O, Inorganic Chemistry, 16(1977) 2704-2710.
F. Herren et al., Neutron diffraction study of Prussian blue, Fe4[Fe(CN)6]3·xH2O. Location of water molecules and long-range magnetic order, Inorg. Chem. 1980, 19, 956-959.
D. Asakura et al., Bimetallic cyanide-bridged coordination polymers as lithium ion cathode materials : core@shell nanoparticles . . . , J. Am. Chem. Soc., 135(2013)2793-2799.
K.-S. Park et al., Enhanced charge-transfer kinetics by anion surface modification of LiFePO4, Chem. Mater. 24(2012)3212-3218.
X. Wu et al., Single-crystal FeFe(CN)6 nanoparticles: a high capacity and high rate cathode for Na-ion batteries, J. Mater. Chem. A., 1(2013)10130-10134.
Y. You et al., High-quality Prussian blue crystals as superior cathode materials for room-temperature sodium-ion . . . , Energy & Environment Science, Doi: 10.1039/C3EE44004D.

\* cited by examiner

ELECTROLYTE ADDITIVES FOR TRANSITION METAL CYANOMETALLATE ELECTRODE STABILIZATION

RELATED APPLICATIONS

This application is a Continuation-in-Part of an application entitled, HARD CARBON COMPOSITE FOR ALKALI METAL-ION BATTERIES, invented by Yuhao Lu et al, Ser. No. 62/009,069, filed Jun. 6, 2014;

and a Continuation-in-Part of an application entitled, METAL CYANOMETALLATE SYNTHESIS METHOD, invented by Long Wang et al, Ser. No. 62/008,869, filed Jun. 6, 2014;

which is a Continuation-in-Part of an application entitled, RECHARGEABLE METAL-ION BATTERY WITH NON-AQUEOUS HYBRID ION ELECTROLYTE, invented by Long Wang et al, Ser. No. 14/271,498, filed May 7, 2014;

which is a Continuation-in-Part of an application entitled, REACTIVE SEPARATOR FOR A METAL-ION BATTERY, invented by Long Wang et al, Ser. No. 14/230,882, filed Mar. 31, 2014;

which is a Continuation-in-Part of an application entitled, NASICON-POLYMER ELECTROLYTE STRUCTURE, invented by Long Wang et al, Ser. No. 14/198,755, filed Mar. 6, 2014;

which is a Continuation-in-Part of an application entitled, BATTERY WITH AN ANODE PRELOADED WITH CONSUMABLE METALS, invented by Yuhao Lu et al, Ser. No. 14/198,702, filed Mar. 6, 2014;

which is a Continuation-in-Part of an application entitled, BATTERY ANODE WITH PRELOADED METALS, invented by Long Wang et al, Ser. No. 14/198,663, filed Mar. 6, 2014;

which is a Continuation-in-Part of an application entitled, METAL BATTERY ELECTRODE WITH PYROLYZED COATING, invented by Yuhao Lu et al, Ser. No. 14/193,782, filed Feb. 28, 2014;

which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014;

which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

This application is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical cells and, more particularly, to an electrolyte containing additives useful for stabilizing transition metal cyanometallate batteries.

2. Description of the Related Art

Transition metal cyanometallates (TMCMs) with large interstitial spaces have been investigated as the cathode material for rechargeable lithium-ion batteries [1, 2], sodium-ion batteries [3, 4], and potassium-ion batteries [5]. With an aqueous electrolyte containing the proper alkali-ions or ammonium-ions, copper and nickel hexacyanoferrates ((Cu,Ni)-HCFs) exhibited a very good cycling life with 83% capacity retained after 40,000 cycles at a charge/discharge current of 17 C [6-8]. However, the materials within the aqueous electrolyte demonstrated low capacities and energy densities because: (1) just one sodium-ion can be inserted/extracted into/from per Cu-HCF or Ni-HCF formula, and (2) these transition metal cyanoferrate (TM-HCF) electrodes must be operated below 1.23 V due to the water electrochemical window. The electrochemical window of a substance is the voltage range between which the substance is neither oxidized nor reduced. This range is important for the efficiency of an electrode, and once out of this range, water becomes electrolyzed, spoiling the electrical energy intended for another electrochemical reaction.

To correct the shortcomings, manganese hexacyanoferrate (Mn-HCF) and iron hexacyanoferrate (Fe-HCF) were used as cathode materials in a non-aqueous electrolyte [9, 10]. Assembled with a sodium-metal anode, Mn-HCF and Fe- HCF electrodes cycled between 2.0V and 4.2 V and delivered capacities of about 110 milliamp hour per gram (mAh/g).

It is worth noting that the actual capacity of a TMHCF electrode is by far smaller than the theoretical value. For instance, the theoretical capacity for Mn-HCF is 170 mAh/g, but the reported capacity was just ~120 mAh/g, as tested in a sodium-ion battery. The capacity difference could be ascribed to the structures and compositions of TMHCFs. Buser, et al. [11] investigated the crystal structure of Prussian Blue (PB), $Fe_4[Fe(CN)_6]_3 \cdot xH_2O$ and found that $Fe(CN)_6$ positions were only partly occupied. The vacancies led to water entering the PB interstitial space and even associating with Fe(III) in the lattice [12]. In consideration of charge neutralization and interstitial space, the vacancies and water both act to reduce the concentration of mobile ions in the interstitial space of TMHCF. As an example, Matsuda, et al. [9] preferred to use $A_{4x-2}M_A[M_B(CN)_6]_x \cdot zH_2O$ as a replacement to the nominal formula of $A_2M_AM_B(CN)_6$ because of the vacancies. Furthermore, the vacancies result in dense defects on the surface of TMHCFs. Without interstitial ions and supporting water, the surface easily collapses. The surface degradation can be aggravated when the interstitial ions in the vicinity of the surface are extracted out during electrochemical reactions. In a battery, such degradation leads to poor capacity retention.

A Cu-HCF electrode with a $Li^+$-Lion electrolyte delivered 120 mAh/g during the first discharge, but its capacity decreased to 40 mAh/g in 10 cycles [13]. By coating with Ni-HCF, the surface of the Cu-HCF electrode was modified and its stability was improved. However, the undercoordinated transition metal (UTM) on the surface retards charge transfer between the TMHCF electrode and electrolyte due to charge repulsion between the UTM and the mobile ions, which may result in poor rate performance. Park, et al. [14] mentioned the surface effect on a $LiFePO_4$ electrode with undercoordinated $Fe^{2+}/Fe^{3+}$ at the surface creating a barrier for $Li^+$ transport across the electrolyte/electrode interface. To improve the capacity retention, some researchers have optimized the synthesis of TMHCFs to reduce defects and vacancies on their surfaces and in the bulk of the material [15, 16]. These defect-free TMHCFs demonstrated a longer cycle life. However, defects and vacancies in TMCM electrode also likely appear during the charge and discharge cycles of a battery, and they are impossible to prevent by synthesis.

It would be advantageous if additives could be included in an electrolyte that would interact and coordinate with surface of TMCM electrodes, to cure and reduce the defects and undercoordinated metal-ions, and to improve the cycle lifetime.

[1] V. D. Neff, Some performance characteristics of a Prussian Blue battery, Journal of Electrochemical Society, 132 (1985) 1382-1384.

[2] N. Imanishi, T. Morikawa, J. Kondo, Y. Takeda, O. Yamamoto, N. Kinugasa, T. Yamagishi, Lithium intercalation behavior into iron cyanide complex as positive electrode of lithium secondary battery, Journal of Power Sources, 79 (1999) 215-219.

[3] Y. Lu, L. Wang, J. Cheng, J. B. Goodenough, Prussian blue: a new framework for sodium batteries, Chemistry Communication, 48(2012)6544-6546.

[4] L. Wang, Y. Lu, J. Liu, M. Xu, J. Cheng, D. Zhang, Goodenough, A superior low-cost cathode for a Na-ion battery, Angew. Chem. Int. Ed., 52(2013)1964-1967.

[5] A. Eftekhari, Potassium secondary cell based on Prussian blue cathode, J. Power Sources, 126 (2004) 221-228.

[6] C. D. Wessells, R. A. Huggins, Y. Cui, Copper hexacyanoferrate battery electrodes with long cycle life and high power, Nature Communication, 2 (2011) 550.

[7] C. D. Wessells, S. V. Peddada, R. A. Huggins, Y. Cui, Nickel hexacyanoferrate nanoparticle electrodes for aqueous sodium and potassium ion batteries. Nano Letters, 11 (2011) 5421-5425.

[8] C. D. Wessells, S. V. Peddada, M. T. McDowell, R. A. Huggins, Y. Cui, The effect of insertion species on nanostructured open framework hexacyanoferrate battery electrode, J. Electrochem. Soc., 159 (2012) A98-A103.

[9] T. Matsuda, M. Takachi, Y. Moritomo, A sodium manganese ferrocyanide thin film for Na-ion batteries, Chemical Communications, DOI: 10.1039/C3CC38839E.

[10] S.-H. Yu, M. Shokouhimehr, T. Hyeon, Y.-E. Sung, Iron hexacyanoferrate nanoparticles as cathode materials for lithium and sodium rechargeable batteries, ECS Electrochemistry Letters, 2(2013)A39-A41.

[11] H. J. Buser, D. Schwarzenbach, W. Petter, A. Ludi, the crystal structure of Prussian blue: $Fe_4[Fe(CN)_6]_3 \cdot xH=O$, Inorganic Chemistry, 16(1977) 2704-2710.

[12] F. Herren, P. Fischer, A. Ludi, W. Hälg, Neutron diffraction study of Prussian blue, $Fe_4[Fe(CN)_6]_3 \cdot xH_2O$. Location of water molecules and long-range magnetic order, Inorg. Chem. 1980, 19, 956-959

[13] D. Asakura, C. H. Li, Y. Mizuno, M. Okubo, H. Zhou, D. R. Talham, Bimetallic cyanide-bridged coordination polymers as lithium ion cathode materials: core@shell nanoparticles with enhanced Cyclability, J. Am. Chem. Soc., 135(2013)2793-2799.

[14] K.-S. Park, P. Xiao, S.-Y. Kim, A. Dylla, Y.-M. Choi, G. Henkelman, K. J. Stevenson, J. B. Goodenough, Enhanced charge-transfer kinetics by anion surface modification of $LiFePO_4$, Chem. Mater. 24(2012)3212-3218.

[15] X. Wu, W. Den, J. Qian, Y. Cao, X. Ai, H. Yang, Single-crystal FeFe(CN)6 nanoparticles: a high capacity and high rate cathode for Na-ion batteries, J, Mater. Chem. A., 1(2013)10130-10134.

[16] Y. You, X.-L. Wu, Y.-X. Yin, Y.-G, Guo, High-quality Prussian blue crystals as superior cathode materials for room-temperature sodium-ion batteries, Energy & Environmental Science, Doi: 10.1039/C3EE44004D.

SUMMARY OF THE INVENTION

Transition metal cyanometallate (TMCM) electrodes in metal-ion batteries have demonstrated good performance, as indicated by high energy density, high power density, and low cost. However, defects and vacancies produced in the TMCM electrodes cause structural degradation, which limits their cycle life. Disclosed herein are electrolyte additives that can interact and coordinate metal ions around these defects and vacancies to support the structures of the TICK enabling a longer cycle lifetime.

Accordingly, a method is provided for the self-repair of a TMCM battery electrode. The battery is made from a TMCM cathode, an anode, and an electrolyte including solution made up of a solvent and an alkali or alkaline earth salt. The electrolyte also includes an additive represented as G-R-g:

where G and g are independently selected from materials that include the elements of nitrogen (N) sulfur (S), and oxygen (O), or combinations of the above-recited elements; and, where R is an alkene or alkane group.

In response to charging and discharging the battery in a plurality of cycles, the method creates vacancies in a surface of the TMCM cathode. Then, the method fills the vacancies in the surface of the TMCM cathode with the electrolyte additive.

The solvent may be water, carbonates, furan, oxane, ether, ketone, ester, amide, acetate, siloxane, or combinations thereof. Some examples of the salt include $A_xCl$, $A_xSO_4$, $A_xNO_3$, $A_xPO_4$, $A_xBr$, $A_xI$, $A_xAlO_2$, $A_xAc$(acetate), $A_xPF_6$, $A_xBF_6$, $A_xClO_4$, $A_xAsF_6$, $A_xAlCl_4$, $A_xB_5Cl_5$, $A_xCF_3SO_3$, $A_x(CF_3SO_2)_2N$, and $A_x(C_2F_5SO_2)_2N$, where "A" is either an alkali or alkaline earth element. In one aspect, the R alkene/alkane may be formed with a substation such as oxygen, silicon, fluorine, chlorine, phosphorus, aluminum, arsenic, selenium, bromine, or combinations thereof. In another aspect, C and g are independently selected from an alkene or alkane group.

The TMCM cathode is expressed by the formula $B_NM1_PM2_Q(CN)_R \cdot FH_2O$;

where B is an alkali or alkaline earth metal;
where M1 M2 are independently selected from transition metals;
where N is in a range of 0 to 2;
where P is less than or equal to 2;
where F is in a range of 0 to 20;
where Q is less than or equal to 2; and,
where R is less than or equal to 6.

The anode can be made from carbonaceous materials, alkali metals, alkaline earth metals, alloys including tin, alloys including lead, alloys including silicon, alloys including phosphorous, alloys including germanium, titillates including alkali metals, titanates including alkaline earth metals, or combinations thereof.

Additional details of the above-described method, an electrolyte with additives, and a battery made with the above-mentioned electrolyte are presented below.

BRIEF DESCRIPTION OF THE DRAWINGS

FIGS. 5A and 4B are an example of the PW electrode where any electrolyte additive has been used, respectively showing capacity vs. cycles, and capacity vs. voltage.

DETAILED DESCRIPTION

Figure 1:
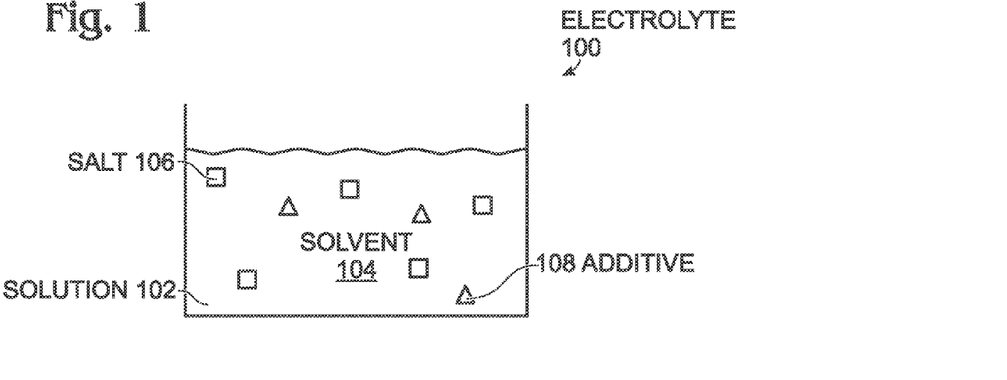
FIG. 1 is a partial cross-sectional view of an electrolyte for use in a battery with transition metal cyanometallate (TMCM) electrodes.

FIG. 1 is a partial cross-sectional view of an electrolyte for use in a battery with transition metal cyanometallate, (TMCM) electrodes. The electrolyte 100 comprises a solution 102 including a solvent 104 and a salt that can be either an alkali or alkaline earth salt. The salt is represented using reference designator 106. The electrolyte 100 also includes an additive, represented with reference designator 108, comprising G-R-g:

where G and g are independently selected from a group of materials that include the element of nitrogen (N) sulfur (S), oxygen (O), or combinations of the above-recited elements.

Typically G≠g. However, in some cases they are the same, such as is the case where G=g=adiponitrile.

R. is an alkene or alkane group. The term "independently selected" means that an element selected for G may, or may not be an element selected for g.

The solvent 104 may be water, carbonates, furan, oxane, ether, ketone, ester, amide, acetate, siloxane, or combinations thereof. Some explicit examples of the salt 106 include $A_xCl$, $A_xSO_4$, $A_xNO_3$, $A_xPO_4$, $A_xBr$, $A_xI$, $A_xAlO_2$, $A_xAc$(acetate), $A_xPF_6$, $A_xBF_6$, $A_xClO_4$, $A_xAsF_6$, $A_xAlCl_4$, $A_xB_5Cl_5$, $A_xCF_3SO_3$, $A_x(CF_3SO_2)_2N$, and $A_x(C_2F_5SO_2)_2N$, where "A" is an alkali or alkaline earth element.

In one aspect, the R alkene or alkane includes a substitution such as oxygen, silicon, fluorine, chlorine, phosphorus, aluminum, arsenic, selenium, bromine, or combinations thereof. For example, if R is the alkene chain $—CH_2—CH_2—CH_2—$, in some cases, some part of R can be substituted with F to form $—CHF—CH_2—CH_2—$, with O to form $—CH_2—O—CH_2—$, or with Cl to form $—CH_2—CH_2—CCl_2—$.

In one aspect, G and g are independently selected from an alkene or alkane group. In other words, if G is an alkene, then g may be either an alkene or an alkane. Likewise, if G is an alkane, then g may be either an alkene or an alkane. As noted above, G and g may not be the same material. However, R may be the same as either G or g. The percentage by weight (wt %) of additive 108 to solution 102 is in a range of 0.1 to 50 wt %.

Figure 2:
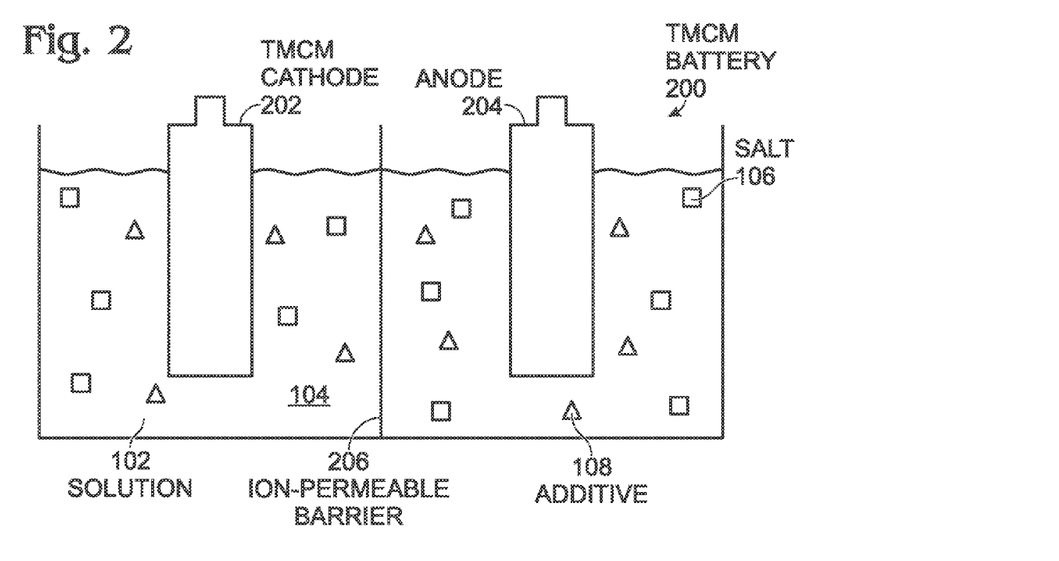
FIG. 2 is a partial cross-sectional view of a TMCM electrode battery.

FIG. 2 is a partial cross-sectional view of a TMCM electrode battery. The battery 200 comprises a TMCM cathode 202 and an anode 204. In some aspects as shown, an ion-permeable barrier 206 may separate the cathode 202 from the anode 204. An electrolyte, as described above in the explanation of FIG. 1, comprises a solution. 102 including a solvent 104 and either an alkali or alkaline earth metal salt 106. The electrolyte also includes additives 108, comprising G-R-g:

where G and g are independently selected from a group of materials including the element of nitrogen (N) sulfur (S), oxygen (O), or combinations of the above-recited elements; and,
where R is an alkene or alkane group.

The solvent 104 may be water, carbonates, furan, oxane, ether, ketone, ester, amide, acetate, siloxane, or combinations thereof. Some explicit examples of the salt 106 include $A_xCl$, $A_xSO_4$, $A_xNO_3$, $A_xPO_4$, $A_xBr$, $A_xI$, $A_xAlO_2$, $A_xAc$(acetate), $A_xPF_6$, $A_xBF_6$, $A_xClO_4$, $AsF_6$, $A_xAlCl_4$, $A_xB_5Cl_5$, $A_xCF_3SO_3$, $A_x(CF_3SO_2)_2N$, and $A_x(C_2F_5SO_2)_2N$, where "A" is an alkali or alkaline earth element.

In one aspect, the R alkene or alkane includes a substitution such as oxygen, silicon, fluorine, chlorine, phosphorus, aluminum, arsenic, selenium, bromine, or combinations thereof. In another aspect, G and g are independently selected as alkanes or alkenes. As noted above, G and g may not be the same material, but R may be the same as either G or g. The percentage by weight (wt %) of additive 108 to solution 102 is in a range of 0.1 to 50 wt %.

The TMCM cathode 202 is expressed by the formula $B_NM1_PM2_Q(CN)_R \cdot FH_2O$;

where B is a first group of metals that may, for example, be an alkali or alkaline earth metal;

where M1 M2 are independently selected from a second group of transition metals;
  where N is in a range of 0 to 2;
  where P is less than or equal to 2;
  where F is in a range of 0 to 20;
  where Q is less than or equal to 2; and,
  where R is less than or equal to 6.

Some examples from the first group of metals include lithium (Li), sodium (Na), potassium (K), rubidium (Rh), cesium (Cs), calcium (Ca), strontium (Sr), barium (Ba), silver (Ag), aluminum (Al), magnesium (Mg), and combinations thereof.

M1 and M2 are each independently selected from the second group of metals that includes titanium (Ti), vanadium (V), chromium (Cr), manganese (Mn), iron (Fe), cobalt (Co), nickel (Ni), copper (Cu), zinc (Zn), niobium (Nb), ruthenium (Ru), tin (Sn), indium (In), cadmium (Cd), Ca, Mg, strontium (Sr), and barium (Ba). M1 and M2 may, or may not be the same metal.

The anode 204 can be made from carbonaceous materials, alkali metals, alkaline earth metals, alloys including tin, alloys including lead, alloys including silicon, alloys including phosphorous, alloys including germanium, titanates including alkali metals, titanates including alkaline earth metals, or combinations thereof.

Figure 3A:
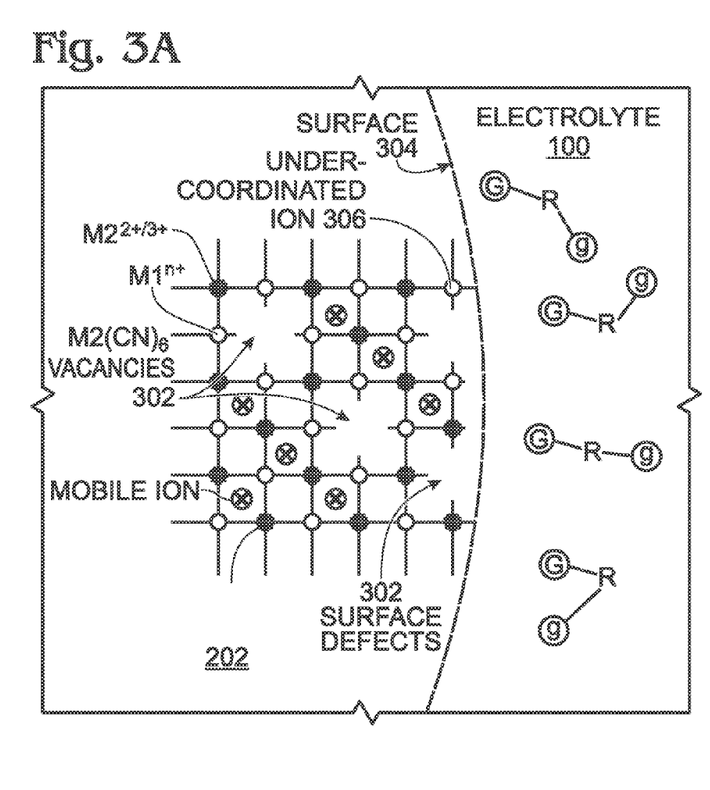
FIG. 3A depicts a fresh TMCM electrode immersed in an electrolyte containing additives.
Figure 3B:
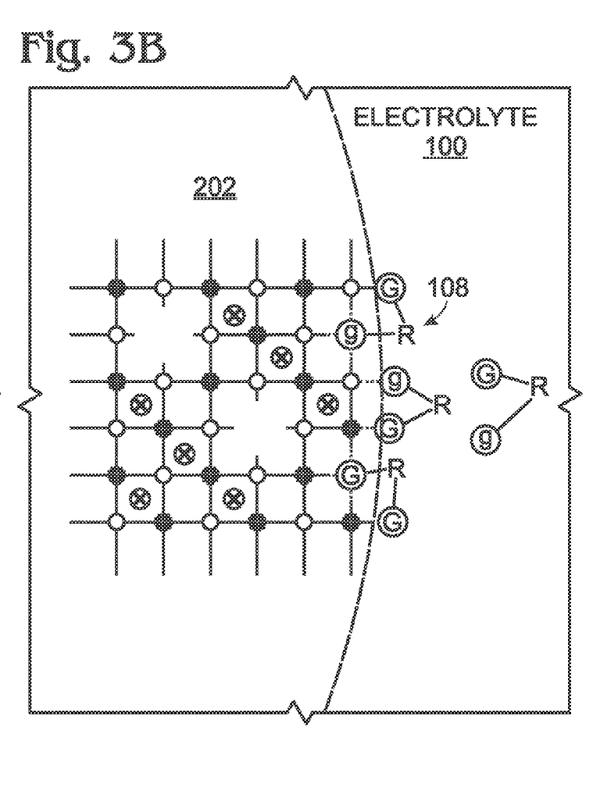
FIG. 3B depicts additives interacting or coordinating with defects on the surface of TMCM electrode to stabilize its structure.

FIG. 3A depicts a fresh TMCM electrode immersed in an electrolyte containing additives. FIG. 3B depicts additives interacting or coordinating with defects on the surface of TMCM electrode to stabilize its structure. During charge and discharge of the battery, mobile ions 300 (✪) can "rock" back and forth between TMCM electrode 202, depicted as $✪_xB_NM1_PM2_Q(CN)_R \cdot FH_2O$, and the counter electrode (not shown). Metal cyanide vacancies or transition metal defects 302 occur, and undercoordinated metal ions 306 appear in TMCM especially near the surface, making the cathode unstable. In its charged state the B-ions are completely removed from the TMCM and its framework may collapse, starting from the surface, due to the lack of supporting B-ions. Consequently, the cycle life becomes an issue in rechargeable batteries with a TMCM electrode. In addition, undercoordinated metal ions can impede the charge transfer across the interface between the electrode and electrolyte because of charge repulsion between undercoordinated metal ions and B-ions.

In order to stabilize the TMCM electrode 202 and reduce defects/vacancies 302 on its surface, an additive 108, G-R-g, is added into the electrolyte 100. G and g represent groups containing N, and/or sulfur, and/or oxygen. R is an alkene or alkane group that may be fluoridized. G and g interact or coordinate with transition-metal ions near the cathode surface 304 to stabilize the structure of TMCM electrode 202. The groups also can connect with the undercoordinated metal ions on the surface to reduce their repulsion to B-ions. FIG. 3B depicts the surface modification of TMCM electrode 202 with additives 108 in the electrolyte 100.

Figure 4A:
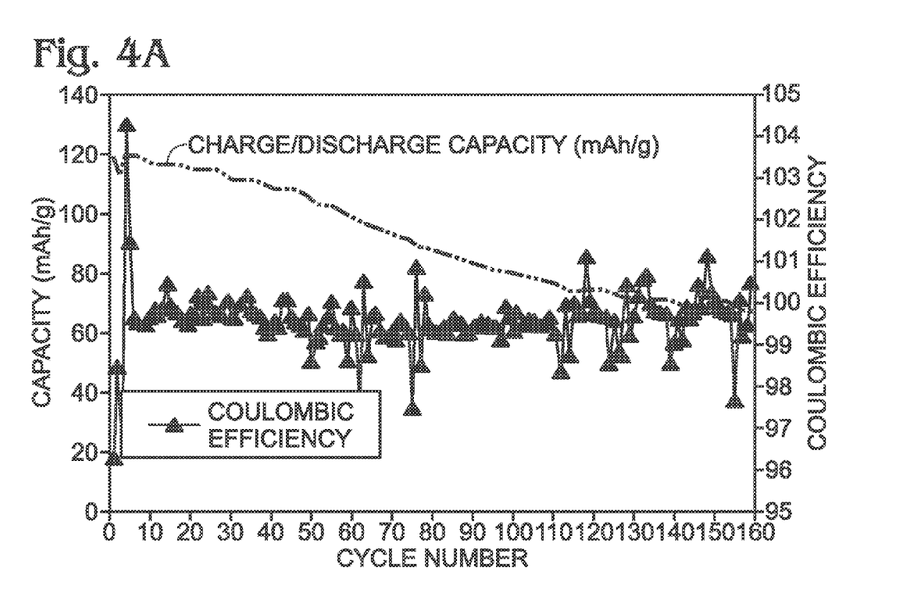
FIGS. 4A and 4B are an example of a Prussian White (PW, $Na_2Fe_2(CN)_6$) electrode where no electrolyte additive has been used, respectively showing capacity vs. cycles, and capacity vs. voltage.
Figure 4B:
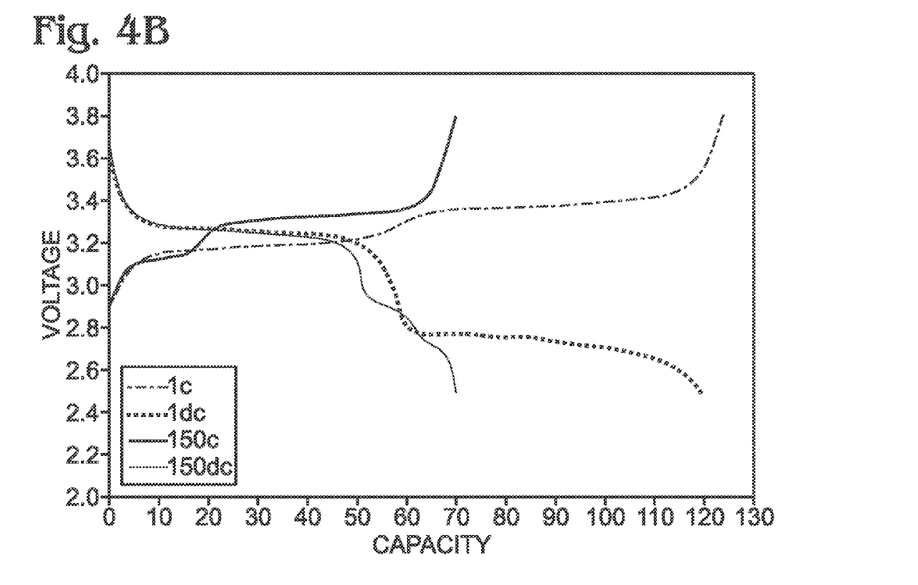

FIGS. 4A and 4B are an example of a Prussian White (PW, $Na_2Fe_2(CN)_6$) electrode where no electrolyte additive has been used, respectively showing capacity vs. cycles, and capacity vs. voltage. With an electrolyte of ethylene carbonate (EC) diethyl carbonate (DEC) containing $NaClO_4$, the performance of PW electrode with a sodium-metal counter electrode is shown. In the first cycle PW electrode delivered a capacity of ~120 mAh/g, and then it faded to 84 mAh/g in 90 cycles.

Figure 5A:
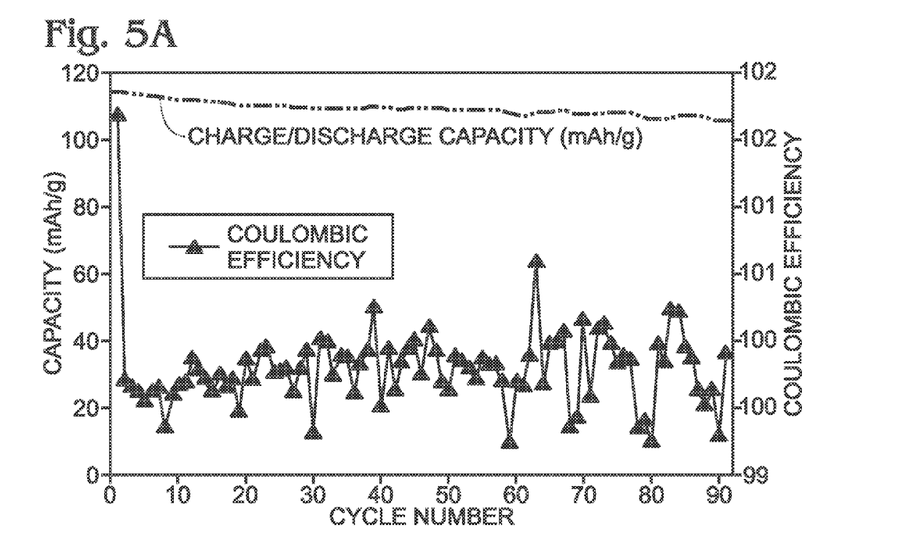
Figure 5B:
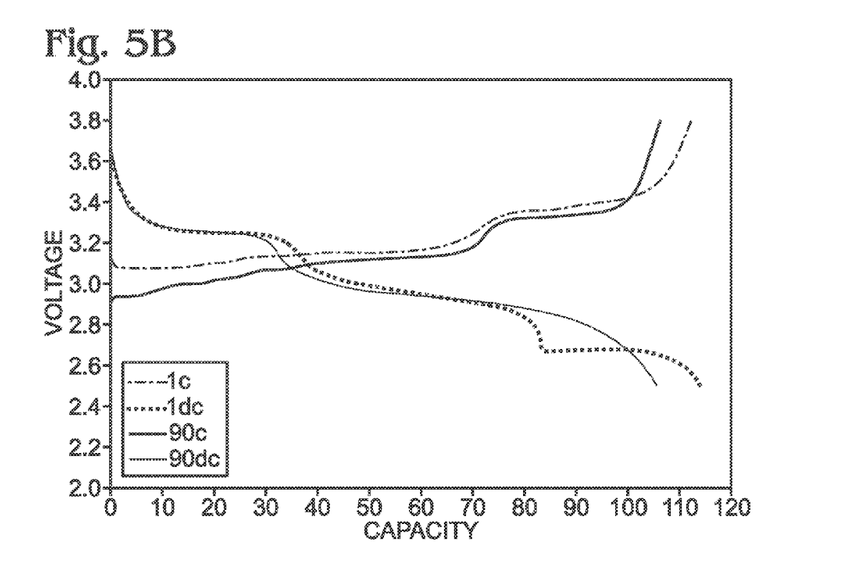

FIGS. 5A and 4B are an example of the PW electrode where any electrolyte additive has been used, respectively showing capacity vs. cycles, and capacity vs. voltage. To improve performance, adiponitrile (ADN) was used as an additive in the electrolyte of EC/DEC and $NaCl_4$. The lone pair electrons in nitrogen interact with d-orbitals of Fe so that the ADN chains can fill up the defects/vacancies to stabilize the PW structure. The ADN additive did not cause a significant difference in the PW electrode charge/discharge profiles and its initial capacity, but improved its cycling performance remarkably as shown.

Figure 6:
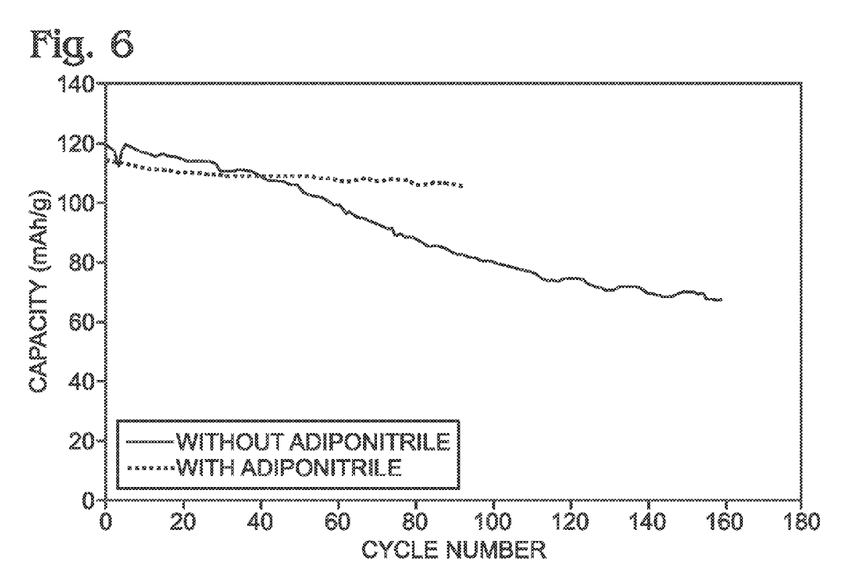
FIG. 6 is a graph comparing the PW electrodes, with and without the ADN additive.

FIG. 6 is a graph comparing the PW electrodes, with and without the ADN additive. In 90 cycles, the PW electrode with ADN additive retained 92.6% of its initial capacity. Under the same conditions, just 70.1% of initial capacity was retained in PW electrode without ADN. In conclusion, ADN stabilized the structure of PW electrode and improved its cycle life.

Figure 7:
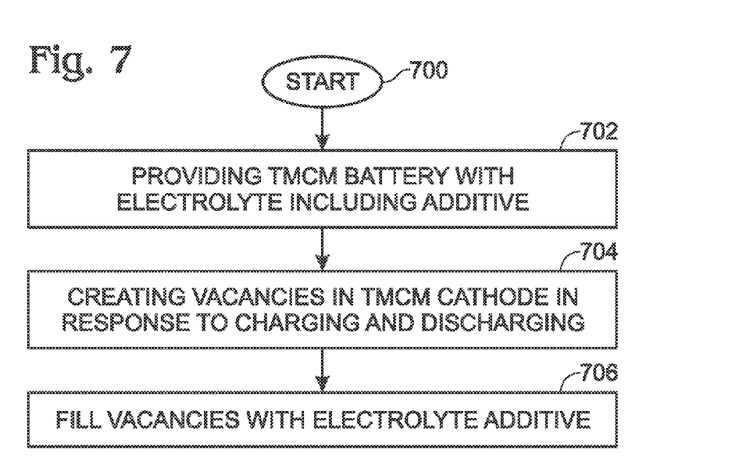
FIG. 7 is a flowchart illustrating a method for self-repairing a. TMCM battery electrode.

FIG. 7 is a flowchart illustrating a method for self-repairing a. TMCM battery electrode. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 700.

Step 702 provides a battery comprising a TMCM cathode, an anode, and an electrolyte. The electrolyte includes a solution comprising a solvent, an alkali or alkaline earth salt, and an additive comprising G-R-g:
  where G and g are independently selected from a group of materials including the element of nitrogen (N) sulfur (S), oxygen (O), and combinations of the above-recited elements; and,
  where R is an alkene or alkane group.

As is well known in the art, an alkene is an unsaturated, aliphatic hydrocarbon with one or more carbon-carbon double bonds. An alkane is a saturated hydrocarbon, consisting of only hydrogen and carbon atoms, with single bonds. In one aspect, the percentage by weight of additive to solution is in the range of 0.1 to 50 wt %. Generally, the battery provided in Step 702 is as described above in the explanation of FIG. 2, above. In response to charging and discharging the battery in a plurality of cycles, Step 704 creates vacancies and defects in a surface of the TMCM cathode. Typically, the battery is discharged by connecting an external load between the anode and cathode. Likewise, the battery is charged by interposing an external power supply between the anode and cathode, to reverse the direction of current flow exhibited during the discharge cycle. Step 706 fills the vacancies and defects in the surface of the TMCM cathode with the electrolyte additive.

Some examples of solvents include water, carbonates, furan, oxane, ether, ketone, ester, amide, acetate, siloxane, and combinations thereof. Some examples of salts include $A_xCl$, $A_xSO_4$, $A_xNO_3$, $A_xPO_4$, $A_xBr$, $A_xI$, $A_xAlO_2$, $A_xAc$ (acetate), $A_xPF_6$, $A_xBF_6$, $A_xClO_4$, $A_xAsF_6$, $A_xAlCl_4$, $A_xB_5Cl_5$, $A_xCF_3SO_3$, $A_x(CF_3SO_2)_2N$, and $A_x(C_2F_5SO_2)_2N$, where "A" is either an alkali or alkaline earth elements.

In one aspect, the R alkene may include one of the following substitutions: oxygen, silicon, fluorine, chlorine, phosphorus, aluminum, arsenic, selenium, bromine, and combinations thereof. In another aspect, G and g are independently either an alkene or alkane. Note: the examples listed above are not an exhaustive list of materials.

An electrolyte has been provided with an additive useful in the self-repair of TMCM battery electrodes. Examples of particular materials have been presented to illustrate the invention. However, the invention is not limited to merely these examples. Other variations and embodiments of the invention will occur to those skilled in the art.

We claim:

1. A transition metal cyanometallate (TMCM) electrode battery comprising:
    a TMCM cathode;
    an anode;
    a non-aqueous electrolyte comprising:
        a solution including a solvent and a salt selected from the group consisting of alkali and alkaline earth metals;
        an additive comprising G-R-g:
            where G and g are nitrile groups; and,
            where R is selected from the group consisting of an alkyl group and an alkenyl group.

2. The battery of claim 1 wherein the solvent is selected from the group consisting of carbonates, furan, oxane, ether, ketone, ester, amide, acetate, siloxane, and combinations thereof.

3. The battery of claim 1 wherein the salt comprises alkali or alkaline earth metal cations and anions selected from the group consisting of chlorides, sulfates, nitrates, phosphates, bromides, iodides, aluminates, acetates, hexafluorophosphates, tetrafluoroborates, perchlorates, hexafluoroarsenates, tetrachloroaluminates, trifluoromethanesulfonates (triflates), bis(trifluoromethanesulfonyl)imides, and bis(pentafluoroethanesulfonyl)imides.

4. The battery of claim 1 wherein the percentage by weight (wt %) of additive to solution is in a range of 0.1 to 50 wt %.

5. The battery of claim 1 wherein the TMCM cathode is expressed by the formula $B_N M1_P M2_Q (CN)_R \cdot F H_2O$;
    where B is selected from a first group of metals comprising alkali, alkaline earth metals, silver (Ag), and aluminum (Al);
    where M1 M2 are independently selected from a second group of transition metals, tin (Sn), indium (In), Ca, Mg, strontium (Sr), and barium (Ba);
    where $N$ is in a range of 0 to 2;
    where $P$ is less than or equal to 2;
    where $F$ is in a range of 0 to 20;
    where $Q$ is less than or equal to 2; and,
    where $R$ is less than or equal to 6.

6. The battery of claim 5 wherein the first group of metals comprise lithium (Li), sodium (Na), potassium (K), rubidium (Rb), cesium (Cs), calcium (Ca), strontium (Sr), barium (Ba), magnesium (Mg), and combinations thereof.

7. The battery of claim 1 wherein the anode is made from a material selected from the group consisting of carbonaceous materials, alkali metals, alkaline earth metals, alloys including tin, alloys including lead, alloys including silicon, alloys including phosphorous, alloys including germanium, titanates including alkali metals, titanates including alkaline earth metals, and combinations thereof.

8. The battery of claim 1 wherein the additive is adiponitrile (ADN).

* * * * *

UNITED STATES PATENT AND TRADEMARK OFFICE
CERTIFICATE OF CORRECTION

PATENT NO. : 9,620,815 B2
APPLICATION NO. : 14/320352
DATED : April 11, 2017
INVENTOR(S) : Lu et al.

It is certified that error appears in the above-identified patent and that said Letters Patent is hereby corrected as shown below:

In Column 1, Lines 7-15, please delete the first two listed related applications. The instant patent does not claim priority to Ser. No. 62/009,069 or Ser. No. 62/008,869.

Signed and Sealed this
Tenth Day of April, 2018

Andrei Iancu
*Director of the United States Patent and Trademark Office*